United States Patent

Meijer

Patent Number: 5,295,776
Date of Patent: Mar. 22, 1994

[54] MOBILE BALE COLLECTOR

[76] Inventor: Thomas H. D. Meijer, Stadsweg 123, 9792 Re Ten Post, Netherlands

[21] Appl. No.: 768,580

[22] PCT Filed: Mar. 15, 1990

[86] PCT No.: PCT/NL90/00031
§ 371 Date: Sep. 19, 1991
§ 102(e) Date: Sep. 19, 1991

[87] PCT Pub. No.: WO90/11007
PCT Pub. Date: Oct. 4, 1990

[30] Foreign Application Priority Data

Mar. 20, 1989 [NL] Netherlands .................. 8900682

[51] Int. Cl.$^5$ .................. B60P 1/40; A01D 90/08
[52] U.S. Cl. .................. 414/111; 414/526; 414/789.7; 198/418.5
[58] Field of Search .................. 198/434, 431, 418.5; 414/111, 507, 526, 679, 789.7, 798.2; 492/35

[56] References Cited

U.S. PATENT DOCUMENTS

| 2,702,131 | 2/1955 | Leupke | 414/789.7 |
| 2,867,340 | 1/1959 | Brownlee et al. | 414/111 |
| 3,703,972 | 11/1972 | Muldoon | 414/789.7 |
| 3,782,570 | 1/1974 | Sunderman | 414/111 |
| 4,604,018 | 8/1986 | Kruse | 414/111 |
| 5,192,177 | 3/1993 | Cardinal | 414/789.7 |

FOREIGN PATENT DOCUMENTS

| 2820408 | 11/1979 | Fed. Rep. of Germany | 414/111 |
| 1244062 | 7/1986 | U.S.S.R. | 198/418.5 |
| 1410170 | 10/1975 | United Kingdom . | |

Primary Examiner—David A. Bucci
Assistant Examiner—Gregory A. Morse
Attorney, Agent, or Firm—Weintraub, DuRoss & Brady

[57] ABSTRACT

A mobile bale collector having a first conveyor moves bales in a conveyance plane opposite to the direction of travel of the collector. The collector forms rows of bales in a direction at right angles to the direction thereof. The mobile bale collector can include a second conveyor which moves the bales opposite to the direction of travel of the collector.

8 Claims, 7 Drawing Sheets

MOBILE BALE COLLECTOR

The invention relates to a mobile bale collector with conveyor means arranged for receiving from a press outlet of a bale press a succession of bales, for conveying the bales such as to form a row of a predetermined number of bales, the row extending at right angles to the direction of travel of the collector, and for discharging this row of bales off the conveyor means in a direction opposite to the direction of travel upon completion of the row, and with detection means for detecting the completion of a row, the detection means being connected to discharge inhibiting means for inhibiting discharge of a row until the row is completed, and in which the conveyor means comprises bale supporting rollers.

A mobile bale collector of this type is disclosed by GB-A-1.410.170. With this prior art collector the conveyor means consists of a roller bed of a number of rollers forming a row of rollers each extending in parallel to the direction of travel of the collector, a push mechanism which pushes a bale dropped on the roller bed by a baler in a direction transverse to the direction of travel to an end of the roller bed, and further means which discharges a completed row of bales off the roller bed.

A disadvantage of the prior art collector is that it is very complex and therefore relatively expensive and susceptible to malfunction. In addition, because of in particular the push mechanism, the width of the collector transverse to the direction of travel is rather great, which makes the collector more difficult to maneuver and to park in a barn. Further, since the push mechanism is such that it does not operate upon completion of a row of bales the last bale of the row will not be pushed against the preceding bale and therefore the rows of bales thus obtained are not compact as is desired. Still further, since the bales received on the roller bed are conveyed firstly in a direction transverse to the direction of travel this offers hardly an opportunity to space successive bales further apart in order to have no interference between a rear end of a bale and the front end of a succeeding bale which could disturb the operation of the collector severely.

The object of the invention is to solve the disadvantages of the mobile bale collector of the type mentioned in the introduction hereinbefore.

According to the invention this object is obtained by that the rollers extend at right angles to the direction of travel, the rollers are screw conveyors and are rotatably driven, the direction of the screw thread and the direction of rotation of the rollers being such that bales supported on the rollers are urged opposite and transverse to the direction of travel the inhibiting means comprise a blocking means behind a row to be formed as seen in the direction of travel and, connected to the blocking means, control means which, upon completion of a row signalled by the detection means remove the blocking means out of its position blocking the completed row, the collector further comprising a guide element which extends parallel to the direction of travel at a place to guide a first received bale of a completed row. This provides a bale collector having a rather simple and therefore less costly construction, which is yet able to provide dense rows of bales of which end parts are aligned positively by urging them against the blocking means.

Other features and advantages of the invention will emerge from the explanation which follows for two embodiments of the mobile bale collection according to the invention.

DETAILED DESCRIPTION OF THE PREFERRED EMBODIMENT

Figure 1:
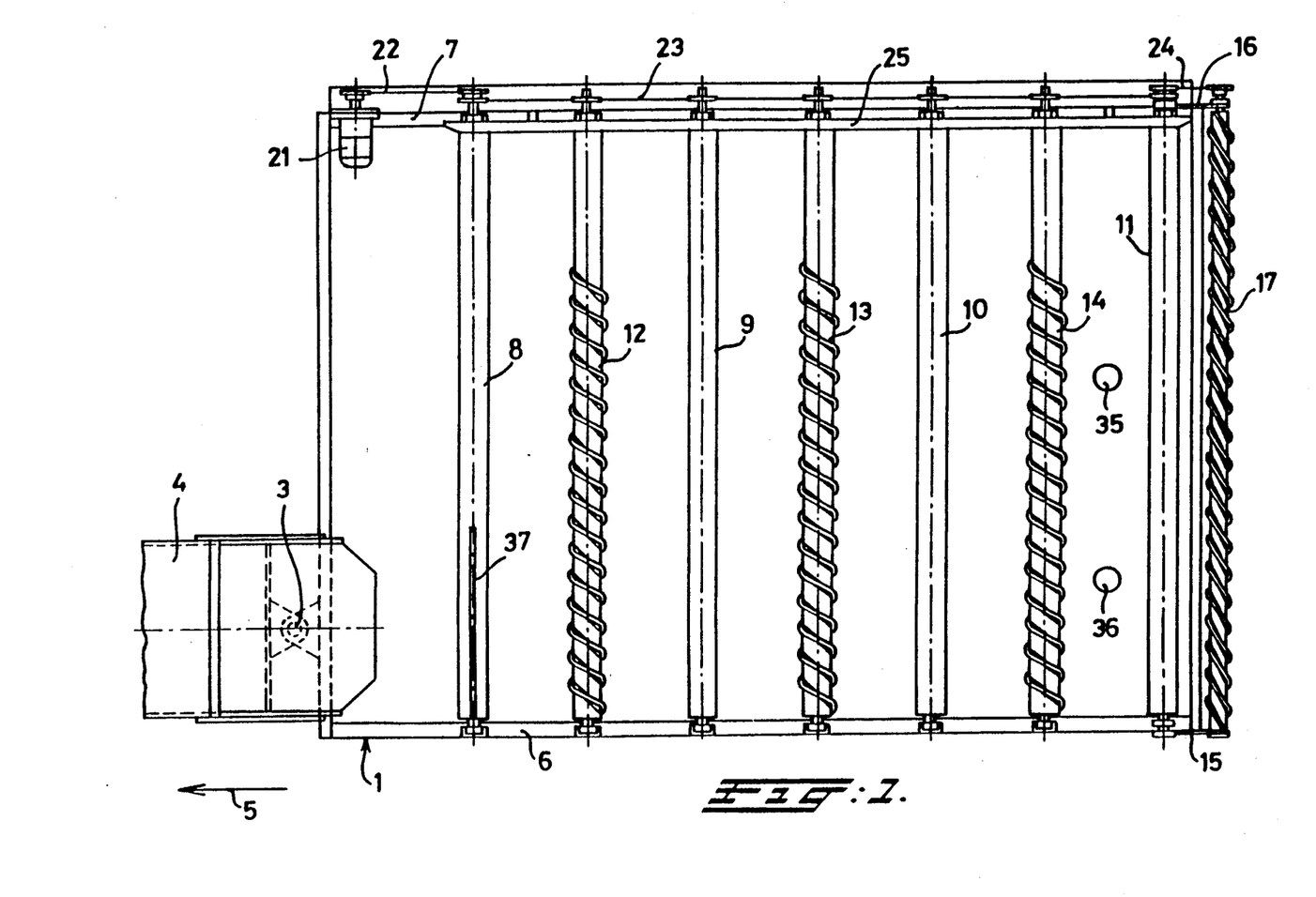
FIG. 1 shows a top view of a first embodiment of the bale collector according to the invention.
Figure 2:
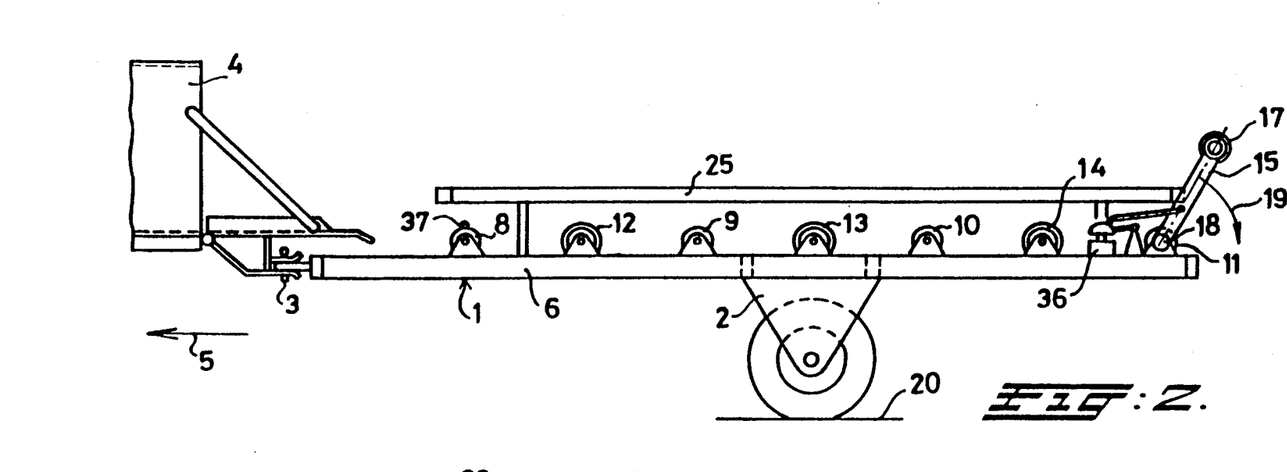
FIG. 2 shows a side view of the bale collector of FIG. 1.

The first embodiment of the bale collector according to the invention shown in FIGS. 1 and 2 comprises a horizontal frame 1 on a wheel base 2, which is not shown in FIG. 1. At one side of the frame 1, the frame 1 is coupled by means of a coupling pin 3 behind the press outlet 4 of a bale press which is not shown in further detail. The bale collector is pulled along by the press in the direction of the arrow 5.

The frame 1 has two frame parts 6 and 7 running parallel to the direction of travel 5. A number of smooth rollers 8, 9, 10 and 11 and threaded rollers 12, 13 and 14, running at right angles to the direction of travel 5, are fitted between the frame parts 6 and 7. The screw threads of the rollers 12, 13 and 14 all run in the same direction and extend from the frame part 6 up to a distance from the frame part 7 which is essentially equal to the width of the press channel 4. A roller 17 with a screw thread running in the same direction as the screw thread of the rollers 12, 13 and 14 is fitted a distance above the rollers 8 to 14, upstream of said rollers between two rotatable arms 15 and 16. The roller 17 is rotatable about a horizontal axis 18 at a distance thereof which coincides with the axis of the roller 11, from a blocking position shown in FIG. 2, in which the roller 17 retains bales conveyed out of the press channel 4, to a clear position obtained by turning in the direction of the arrow 19, in which bales present on the rollers 8 to 14 are conveyed over the roller 17 onto the ground 20.

The rollers 8 to 14 and 17 are rotatable in bearings fixed on the frame parts 6 and 7 and at the frame part 7 chain wheels, over which drive chains 22, 23, 24 are guided, are fitted on a shaft of a motor 21. The motor 21 can be any suitable motor, but is preferably a hydraulic motor which is fed in series with a volume regulator by the hydraulic system of the bale press or of a vehicle pulling the bale press. The motor 21 is set in such a way by means of, for example, the volume regulator that the peripheral speed of the rollers 8 to 14 and 17 is higher than the speed of travel of the bale collector. The gear wheels and chains 22, 23 and 24 are not shown in FIG. 2.

A horizontal guide element 25 is fitted at the ends of the rollers 8 to 14 at the frame part 7, for guiding a bale against it in a direction opposite to the direction of travel 5.

Figure 3:
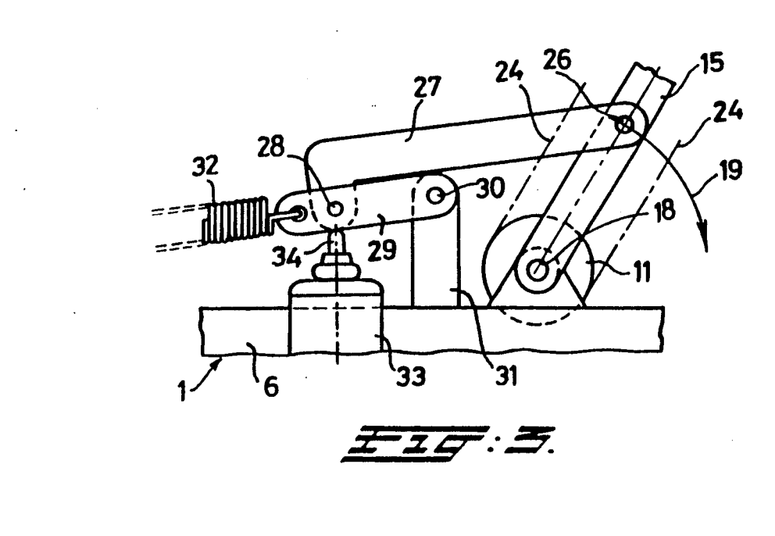
FIG. 3 shows on a larger scale a part of the blocking means shown in FIG. 2.

FIG. 3 shows on a larger scale the blocking means, not shown in FIG. 1, for the blocking roller 17 of the bale collector of FIG. 2, which comprise the blocking roller 17 not shown in FIG. 3.

An end of another arm 27 is connected to the arm 15 in such a way that it can rotate about a horizontal axis 26. At the upstream side of the roller 11 the other end of the arm 27 is fixed to yet another arm 29 so that it can rotate about a horizontal axis 28. Downstream of the axis 28 the arm 29 is fixed to a support 31 of the frame 1 in such a way that it is rotatable about a horizontal axis 30. Fitted to the arm 29, upstream of the axis 28, is a tension spring 32, whose other end (not shown) is fixed further upstream to the frame 1. The spring 32 is omitted in FIG. 2, for the sake of clarity. In the blocking position of the roller shown, the arms 15, 27 and 29 are pulled by the spring 32 into the positions shown, in which the axis 28 is at a level below that of the axis 30 and the axis 26 is at a level above that of the axis 30. A lifting element 33, which can be an electromagnet, with a vertically displaceable core 34, is fixed on the frame 1 at such a point that when the lifting element 33 is activated the core 34 moves the axis 28 through a dead centre above the axis 30, which enables the arm 15 to turn in the direction of the arrow 19 when a force exerted on the roller 17 by the bales is greater than the opposite tensile force of the spring 32. The tensile force of the spring 32 is so great that when no opposing force is exerted on the roller 17 the arm 15 is turned as far as possible in a direction opposite to the direction 19.

Figure 4:
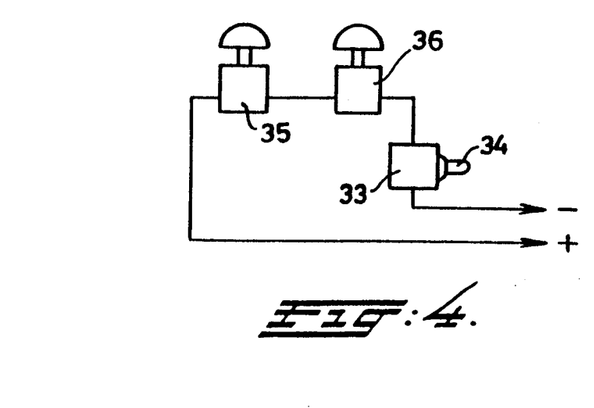
FIG. 4 shows an electrical diagram for the control of a lifting element of the blocking means.

Fitted at two places, which will be explained below, are two electric switches 35 and 36 which, as shown in FIG. 4, are connected electrically to each other in series and in series to an electromagnetic lifting element 33 and an electrical power supply.

The way in which the bale collector shown in FIG. 1 works is explained below with reference to FIGS. 5a and 5b, which show two phases of the operation.

Bales coming from the press channel 4 of the bale press are conveyed by the rollers 8 to 14 against the roller 17. The bales are then conveyed in succession against the guide element 25 at right angles to the direction of travel 5 by the roller 17, and during conveyance of the bales to the roller 17 to some extent by the rollers 12, 13 and 14, thus forming a row of bales, in the example shown three bales. When the row of bales is assembled, the switches 35 and 36 are pressed by the bales resting on said switches, which actuates the lifting element 33. Since the force exerted through the action of rollers 8 to 14 by the row of bales on the roller 17 is greater than the tensile force of the spring 32, the arm 15 will turn in the direction of the arrow 19 out of the blocking position into the clear position in order to allow the row of bales through, as shown in FIG. 5b.

It is preferable to fit on the roller 8 opposite the press channel 4 one or more projections which can be strips 37 running in the direction of the length of the roller 8, and which slightly accelerate a bale coming out of the press channel 4, which produces a greater distance from a following bale, as a result of which more tine is obtained for moving the accelerated bale in the crosswise direction, and as a result of which the processing speed of the bale press and that of the bale collector can be greater than in an embodiment without one or more strips 37.

The use of screw thread on the rollers 12, 13 and 14 is to ensure that the bales of a row do not run askew during their transverse movement, and that the bales are placed in a row close against each other and are deposited in dense rows on the ground. In order to reduce the friction which occurs during the conveyance of a row of bales off the rollers, the end parts of the rollers 12, 13 and 14 at the frame part 7 have a smooth periphery over a distance which is essentially equal to the width of the press channel 4.

A second embodiment of the bale collector according to the invention is explained below with reference to FIGS. 6 to 9, said embodiment having an additional part downstream compared with the first embodiment, for collecting thereon one or more rows of bales and for discharging from this part a predetermined number of rows of bales collected on the collector.

In FIGS. 6 to 9 parts having the same function as that of parts of the first embodiment explained with reference to FIGS. 1 to 5 are indicated by the same reference numbers with the addition of an apostrophe.

Figure 6:
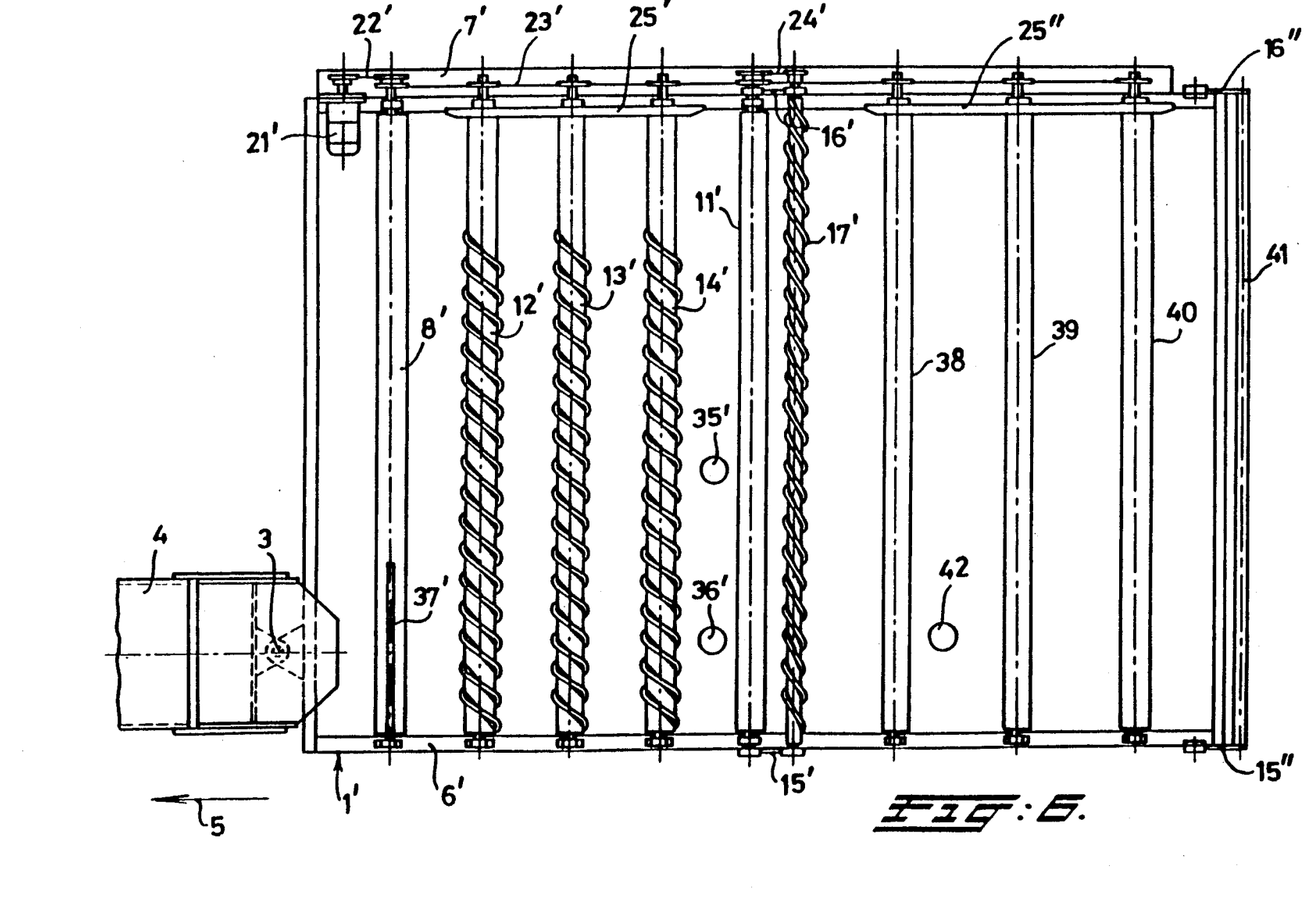
FIG. 6 shows a top view of a second embodiment of the bale collector according to the invention.
Figure 7:
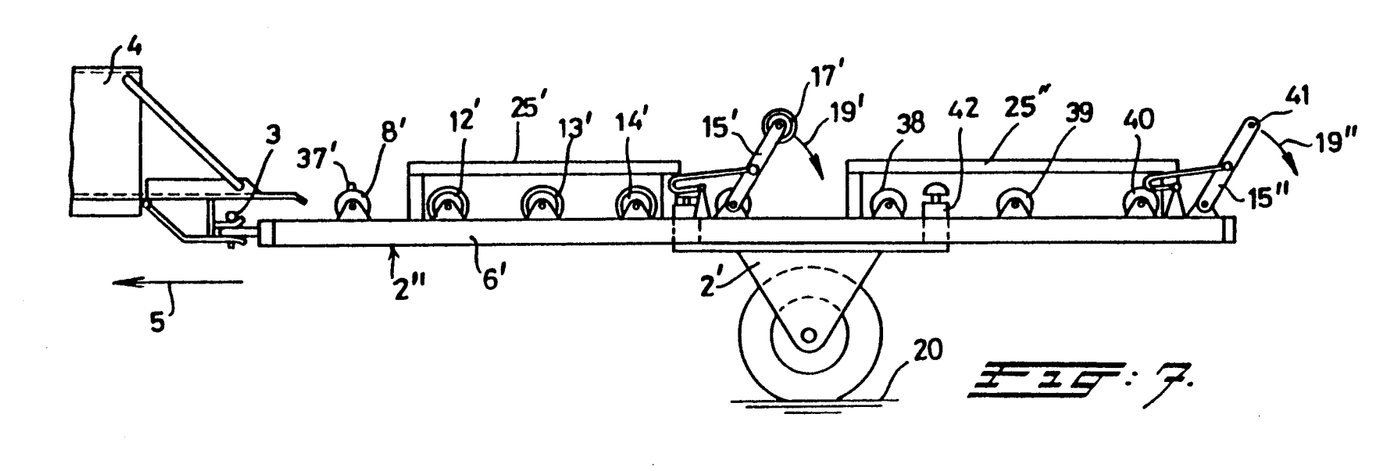
FIG. 7 is a side view of the bale collector of FIG. 6.

The part of the second embodiment present upstream of an including the blocking roller 17', which in the embodiment of FIG. 6 is a first blocking roller, works in the same way as the first embodiment, the only difference being that on passing the roller 17' a row of bales is conveyed onto three smooth rollers 38, 39 and 40 and along a guide element 25" instead of being placed on the ground. The rollers 38, 39 and 40 are rotatable about horizontal axes and each have at their respective ends at the frame part 7' a chain wheel about which the chain 23' is guided in such a way that the rollers 38, 39 and 40 convey a bale in the opposite direction to the direction of travel 5.

Figure 8:
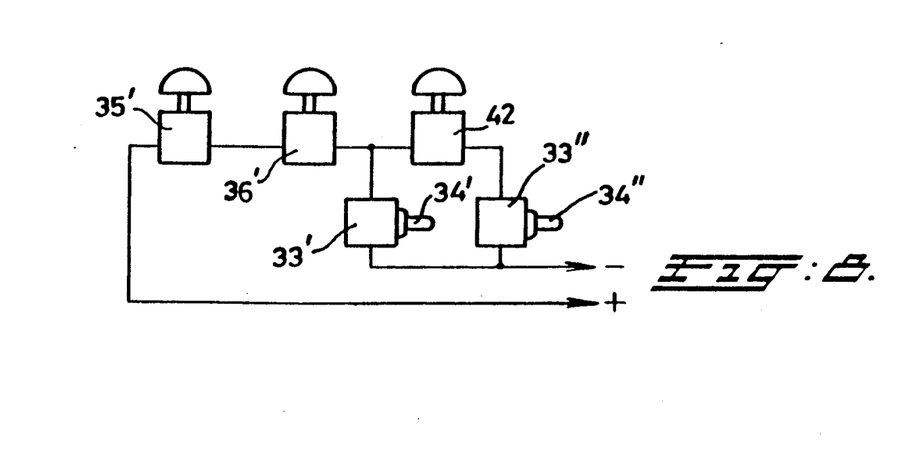
FIG. 8 shows an electrical diagram for the control of two lifting elements of the bale collector of FIG. 6.

The conveyance of bales over the rollers 38, 39 and 40 is limited by a horizontal blocking element 41 which is fitted above the level of the rollers 38, 39 and 40, and which can be a roller, bar or pipe whose ends are fixed to arms 15" and 16", which work in the same way as the arms 15, 16 and 15', 16'. The arm 15' and the arm 15" are each connected to lifting and retracting means of the same type as the means 26 to 34 shown in FIG. 3. As shown in FIG. 8, a series circuit is connected parallel to the lifting element 33' for the arm 15' for a switch 42 which is fitted in the added part of the bale collector, and a lifting element 33" for the arm 15".

The way in which the bale collector shown in FIG. 6 works is explained below with reference to FIGS. 9a to 9d, which show four phases of the operation.

Figure 5A:
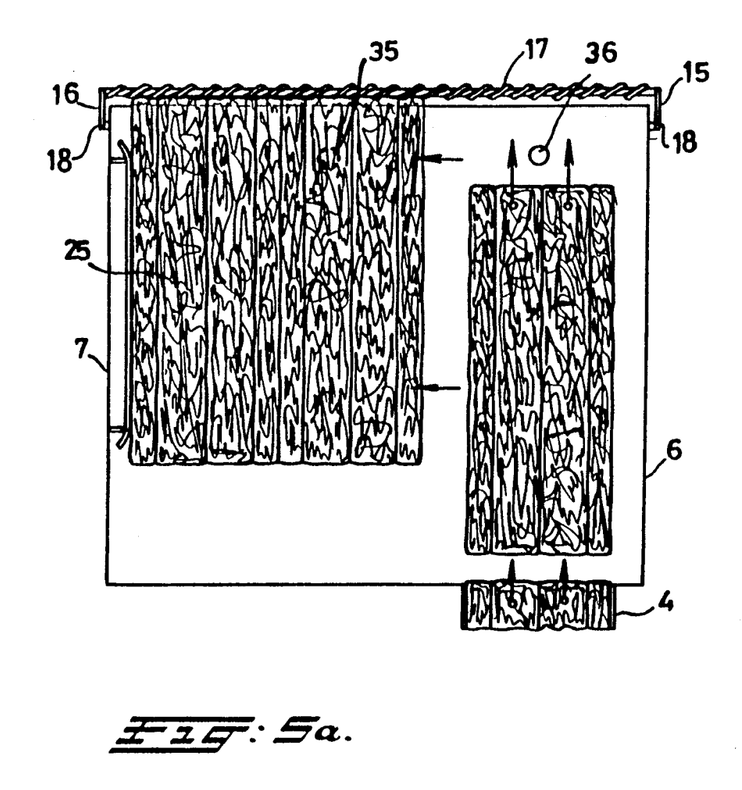
FIGS. 5a and 5b show two phases of the operation of the collector of FIG. 1.
Figure 5B:
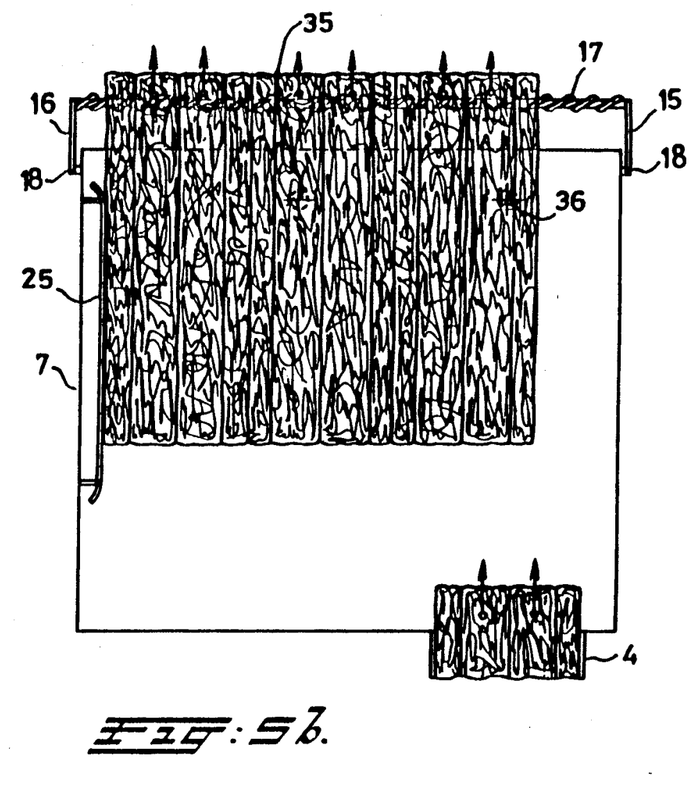
Figure 9A:
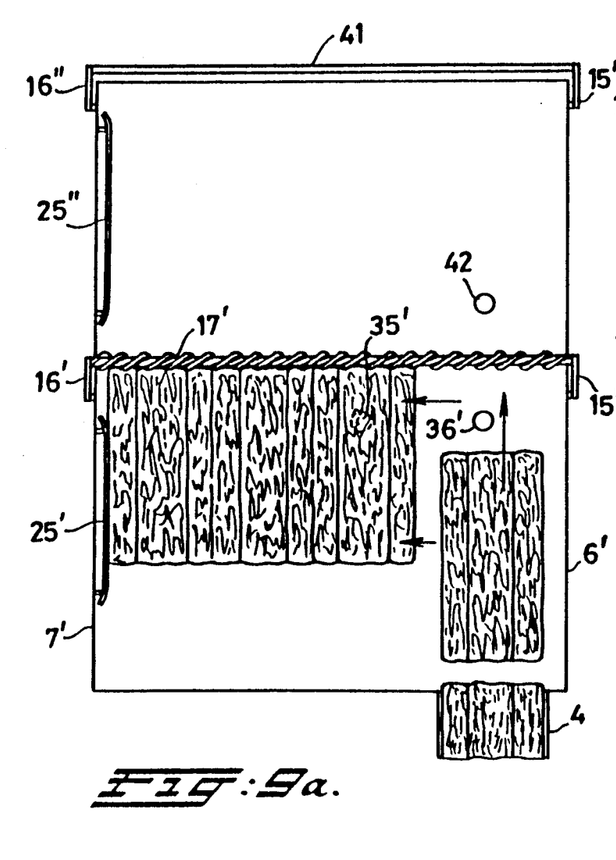
FIGS. 9a, 9b, 9c and 9d show four phases of operation of the bale collector of FIG. 6.
Figure 9B:
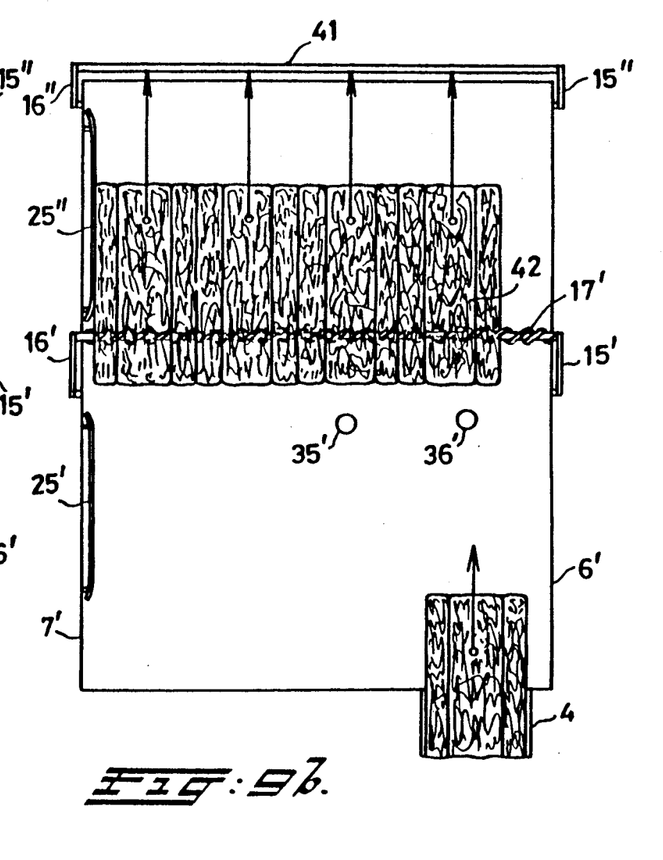

FIGS. 9a and 9b correspond to the situations shown in FIGS. 5a and 5b. In the situation of FIG. 9b a row of bales collected against the blocking roller 17' is, however, not placed on the ground, but is conveyed onto an additional part of the collector by the rollers 38, 39 and 40.

Figure 9C:
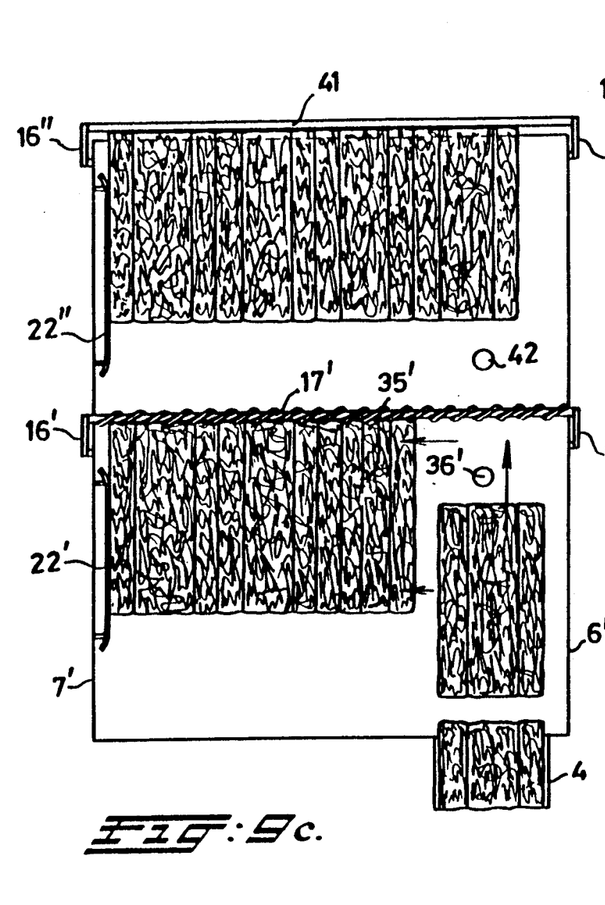
Figure 9D:
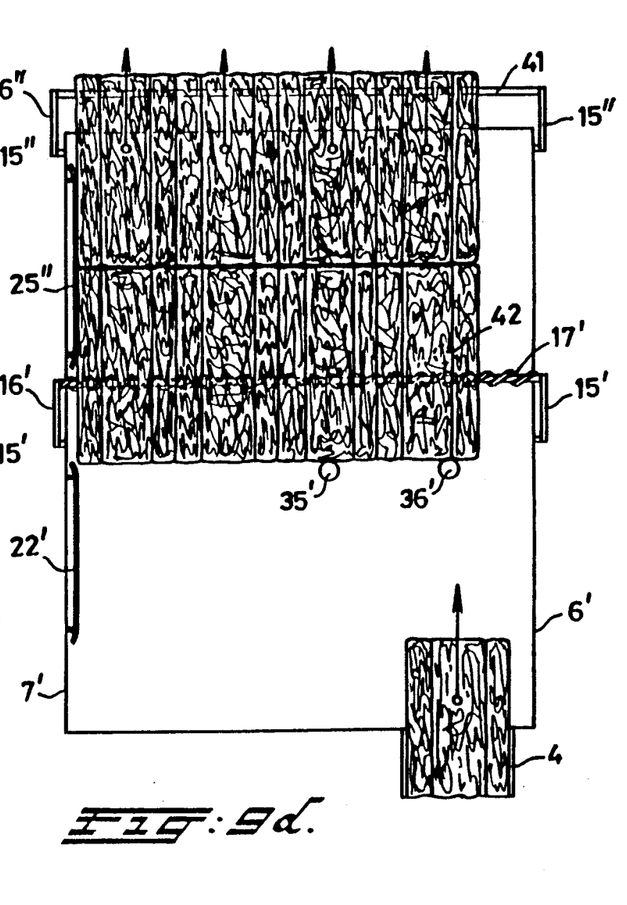

The situation of FIG. 9c corresponds to the situation of FIG. 9a, but in the situation of FIG. 9c a row of bales has already collected against the blocking element 41.

When a new row of bales has formed against the blocking roller 17', this row will pass the blocking roller 17' and be conveyed against the row which is already resting against the blocking element 41, as a result of which all switches 35', 36' and 42 are pressed by the bales and are thereby closed, which means that the lifting element 33" is actuated and the blocking element 41 is turned in the direction of the arrow 19" to allow through the two rows of bales, which are then deposited on the ground 20.

It will be clear that the part of the bale collector following the blocking roller 17' can have greater dimensions and correspondingly more rollers of the type like rollers 38 to 40 for collection thereon of more rows of bales.

It is also possible within the scope of the invention to deposit on the ground only the rows of bales which have collected on the added part downstream of the blocking roller 17', in which case during this deposition the blocking roller 17' remains up in its high position and a new row of bales is collected against it.

It is also possible within the scope of the invention to drive the rollers in a different manner, for example by means of a coupling to the wheels of the wheel base 2, and the switches and lifting elements can be pneumatic or hydraulic elements.

I claim:
1. A mobile bale collector comprising:
   (a) conveyor means for receiving a succession of bales, the conveyor means forming a row of a predetermined number of bales, the row extending at right angles to the direction of travel of the collector, the conveyor means discharging the row of bales off the conveyor means in a direction opposite to the direction of travel of the collector upon completion of the row;
   (b) detection means for detecting the completion of a row;
   (c) discharge inhibiting means for inhibiting discharge of a row until the row is completed, the detection means being operatively connected to the discharge inhibiting means, and
   wherein the conveyor means comprises co-planar bale supporting rollers, extending at right angles to the direction of travel of the collector, the rollers being screw conveyors which are rotatably driven, the direction of the screw thread and the direction of rotation of the rollers being such that bales supported on the rollers are urged in a first direction opposite to the direction of travel of the collector and, then, in a second direction, transversely to the direction of travel of the collector, and further wherein the inhibiting means comprises a blocking means behind a row to be formed as seen in the direction of travel and control means which, connected to the blocking means, such that upon completion of a row signalled by the detection means, the control means removes the blocking means out of its position blocking the completed row, the collector further comprising a guide element, which extends parallel to the direction of travel of the collector at a place to guide a first received bale of a completed row.

2. The mobile bale collector according to claim 1, wherein the surfaces of the rollers, which support the bale received as first bale of a completed row, are devoid of screw thread over a length substantially corresponding to the length over which the roller is covered by the bale.

3. The mobile bale collector according to claim 1 wherein the conveyor means receives bales from a press outlet, the conveyor means further comprises a substantially non-splined front end roller, which extends near the press outlet parallel to the co-planar bale supporting rollers, the front end roller being rotatably driven in the same direction as the co-planar bale supporting rollers and which has at least one projection in the region of the press outlet to accelerate a bale supported thereon.

4. The mobile bale collector according to claim 3, wherein the at least one projection is a strip which extends substantially in the lengthwise direction of the roller.

5. A mobile bale collector comprising:
   (a) conveyor means arranged for receiving from a press outlet of a bale press a succession of bales, the conveyor means forming a row of a predetermined number of bales, the row extending at right angles to the direction of travel of the collector, the conveyor means discharging the row of bales off the conveyor means in a direction opposite to the direction of travel of the collector upon completion of the row;
   (b) detection means for detecting the completion of a row;
   (c) discharge inhibiting means for inhibiting discharge of a row until the row is completed, the discharge means being operatively connected to the detection means,
   and wherein the conveyor means comprises co-planar bale supporting rollers, extending at right angles to the direction of travel of the collector, the rollers being screw conveyors and being rotatably driven, the direction of the screw thread and the direction of rotation of the rollers being such that bales supported on the rollers are urged in a first direction opposite to the direction of travel of the collector and, then, in a second direction, transversely to the direction of travel of the collector, and further wherein the inhibiting means comprises a blocking means behind a row to be formed as seen in the direction of travel, and control means connected to the blocking means, which, upon completion of a row signalled by the detection means, removes the blocking means out of its position blocking the completed row, the collector further comprising a guide element, which extends parallel to the direction of travel of the collector at a place to guide a first received bale of a completed row, and
   still further wherein the blocking means comprises a roller which is a rotatably driven screw conveyor which extends at right angles to the direction of travel of the collector, the direction of the thread and the direction of rotation being such that the blocking roller urges bales, held against it, in a direction transverse to the direction in which the supporting rollers urge the bales.

6. The mobile bale collector according to claim 1 having further a rear part, seen in the direction of travel, having further conveyance means for receiving thereon at least one row of bales discharged from the collector part in front of the rear part and having further inhibiting means at the rear end of said rear part for blocking rows of bales successively collected on the rear part until a group of a predetermined number of rows is completed on both parts, wherein the further conveyance means comprises a number of rollers parallel to the bale supporting rollers of the front part and rotatably driven in a direction to urge the bales opposite to the direction of travel, and the further inhibiting means comprises a blocking means in front of a group to be formed and, connected to the blocking means further control means which, upon completion of a group signalled by further detection means, removes the blocking means out of its position blocking the completed group to discharge from both parts.

7. The mobile bale collector according to claim 1, wherein any of the control means comprises a lever mechanism hingedly connected to the associated blocking means and having an appropriate control device which when signalled by the associated detection means takes the mechanism through a dead centre thereof, so that the blocking means is removed out of its position blocking the bales urged against it, and further comprising restoring means connected to the blocking means for returning the blocking means to its idle position after discharge of any row urged against it.

8. The mobile bale collector according to claim 7, wherein the restoring means are springs.

* * * * *